United States Patent [19]

Barnes

[11] 4,214,029
[45] Jul. 22, 1980

[54] PACKAGING LAMINATE

[75] Inventor: Donald E. Barnes, Minnetonka, Minn.

[73] Assignee: Champion International Corporation, Stamford, Conn.

[21] Appl. No.: 955,888

[22] Filed: Oct. 30, 1978

[51] Int. Cl.$^2$ .................... B32B 7/10; B32B 15/02
[52] U.S. Cl. .................... 428/200; 426/126; 428/209; 428/213; 428/343; 428/344; 428/347; 428/913
[58] Field of Search .............. 428/209, 343, 344, 347, 428/332, 336, 153, 213, 214; 426/126; 229/3, 5 MS

[56] References Cited

U.S. PATENT DOCUMENTS

| | | | |
|---|---|---|---|
| 2,101,182 | 12/1937 | Kittredge et al. | 428/347 X |
| 2,185,470 | 1/1940 | MacDonald et al. | 428/347 X |
| 3,503,831 | 3/1970 | Oyama | 428/332 |
| 3,582,452 | 6/1971 | Britton | 428/209 |
| 3,770,122 | 11/1973 | Thiele | 428/336 X |
| 3,785,911 | 1/1974 | Ungar et al. | 428/153 |
| 4,009,312 | 2/1977 | Hayashi et al. | 428/214 X |
| 4,045,607 | 8/1977 | Swearingen et al. | 428/209 X |
| 4,058,632 | 11/1977 | Evans et al. | 426/126 |
| 4,101,698 | 7/1978 | Dunning et al. | 428/209 X |

Primary Examiner—Thomas J. Herbert, Jr.
Attorney, Agent, or Firm—Evelyn M. Sommer

[57] ABSTRACT

A unitary packaging laminate comprising a foil substrate, a polypropylene outer layer, an intermediate layer of polyethylene or ethylene-acrylic acid copolymer located between and adhered to said substrate and said outer layer, a printed adhesive pattern of low temperature heat sealable material on the exterior surface of said outer layer, and a coating of low temperature heat sealable material on the inner surface of said substrate.

2 Claims, 2 Drawing Figures

PACKAGING LAMINATE

BACKGROUND OF THE INVENTION

A variety of products, such as comestibles, require packaging material being resistant to moisture-vapor and gas transmission so that the products themselves do not deteriorate due to migration of moisture or gas into the product from the environment or due to loss of moisture or certain gases from the product itself to the atmosphere. Such packaging material must not only have such excellent barrier properties, it must also be resistant to fracturing so that it can be placed about various shaped packages and sealed without loosing its moisture and vapor barrier properties due to cracking in areas where it has been bent, folded, sealed and the like.

A variety of laminates has been proposed for this purpose involving combinations of plastic and metal films, none of which are entirely suitable either in terms of their moisture-vapor and gas transmission rates and fracture properties or in terms of cost. In some instances, the laminate material proposed for wrapping is itself of such a thickness and weight as to be unsuitable for use either in terms of the added cost or in terms of being able to be properly handled by conventional overwrapping apparatus conventionally used in packaging products.

In short, it has not been heretofore possible to have a suitable packaging film which was useful as an overwrap for containers to ensure long term shelf life for the product packaged. The products, as noted, are those that are susceptible to a deterioration due to migration of moisture-vapor and/or gases from the product or to the product through the packaging material.

SUMMARY OF THE INVENTION

A novel packaging laminate has now been found having excellent moisture-vapor and gas barrier properties and at the same time, being fracture resistant even when folded sharply or creased, and which can be handled in conventional wrapping apparatus.

Briefly stated, the present invention comprises a unitary packaging laminate comprising a foil substrate, a polypropylene outer layer, an intermediate layer of polyethylene or ethylene-acrylic acid copolymer located between and adhered to said substrate and said outer layer, a printed adhesive pattern of low temperature heat sealable material on the exterior surface of said outer layer, and a coating of low temperature heat sealable material on the inner surface of said substrate.

DETAILED DESCRIPTION OF THE DRAWINGS

Figure 1:
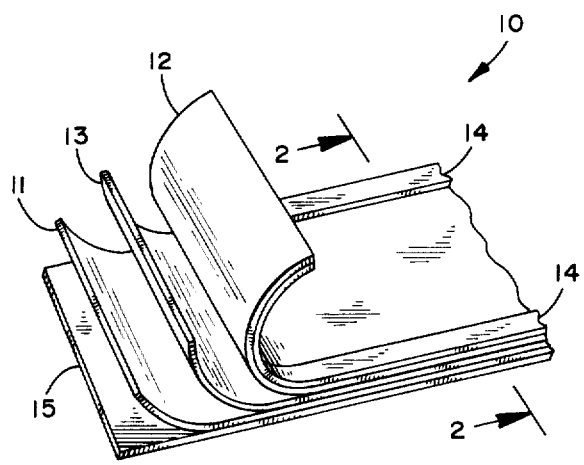
FIG. 1 is a perspective view of the packaging laminate of the present invention with certain of the individual layers partly separated to better illustrate the construction.
Figure 2:
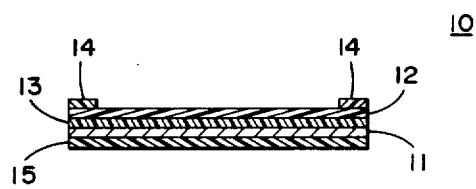
FIG. 2 is a sectional view taken along lines 2—2 of FIG. 1.

The invention will be described in connection with the drawing which illustrates the preferred embodiment of the invention.

Referring to FIG. 1, it will be seen that the laminate 10 comprises a foil substrate 11, a polypropylene outer layer 12 and an intermediate layer of polyethylene or ethylene-acrylic acid copolymer 13 located between the substrate 11 and the outer layer 12 and bonded thereto in the conventional manner. A printed adhesive pattern 14 low temperature heat sealable material is on the exterior surface of the polypropylene outer layer 12 and a coating 15 of low temperature heat sealable material is adhered to the inner surface of the substrate 11.

It will be readily apparent that the printed adhesive pattern 14 will have a shape dependent upon the package to be ultimately formed, that is to say, that the adhesive is put on in a pattern such as to ensure adhesion where needed in completing the wrap.

As to the individual materials, the foil substrate can be any metallic foil conventionally used in packaging such as steel or aluminum foil. Preferably, it is aluminum foil having a thickness about 0.00035 inch. With respect to the outer layer 12, it is polypropylene of 75 to 100 gauge.

The intermediate layer can be as noted, any conventional polyethylene or ethylene-acrylic acid copolymer. The intermediate layer 13 acts to adhere the polypropylene and foil together to form a unitary laminate and at the same time acts to increase the moisture-vapor and gas transmission resistance of the total laminate and also to increase resistance to fracturing. The thickness of this intermediate layer can vary widely, but it should be thick enough to ensure that it forms a continuous layer between the foil and the polypropylene outer layer.

The inner surface of the foil is coated with a low temperature heat seal material compatible with the foil that is capable of being adhered thereto and at the same time, compatible with the printed adhesive pattern so as to facilitate sealing when wrapping is being effected. Any of the conventional and well-known low temperature heat seal materials can be used for this purpose, including thermoplastic and thermosetting resins.

On the outer surface of the polypropylene layer 12 is a printed adhesive pattern of low temperature heat sealable material. The particular low temperature heat sealable coating used can be the same as that utilized to form the inner surface layer 15. As previously noted, the printed pattern is placed on the outer layer in a predetermined pattern so that the adhesive is in areas only where needed to effect sealing of the laminate about the package to be overwrapped. The thickness of this layer is that conventionally used for adhesive and the pattern is applied on the outer layer by any of the conventional adhesive application apparatus.

The method of forming the laminate forms no part of the instant invention and any of the conventional procedures and apparatus used for this purpose are suitable. Thus, as already has been noted, the polypropylene outer layer foil substrate and intermediate layer are simply bonded together by pressure and heat. The heat seal coating is applied by the usual coating apparatus such as a knife coater to the thickness desired as is the printed adhesive pattern.

It is important in this invention to use a low temperature heat seal material in order to prevent any possibility of burn-through when the laminate is being used to wrap a material. That is to say, as the conventional wrapping apparatus is applying the laminate about a package and heat applied to seal the same, the wrapping apparatus can be set so that the sealing bars are at low temperatures. This prevents any burn-through at the sealing points or any other damage to the laminate thereby eliminating any possibility of weakness at this point and consequent loss of desired moisture-vapor and gas barrier properties or resistance to fracturing.

It has been found that food products susceptible to moisture, for example, have excellent shelf life when overwrapped with the laminate of the present invention. In some instances, several times better than with conventional overwrap material.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A unitary packaging laminate consisting essentially of a foil substrate, a polypropylene outer layer, an intermediate layer of polyethylene or ethylene-acrylic acid copolymer located between and adhered to said substrate and said outer layer, a printed adhesive pattern of low temperature heat sealable material on the exterior surface of said outer layer, and a coating of low temperature heat sealable material on the inner surface of said substrate.

2. The packaging laminate of claim 1 wherein said foil is aluminum foil having a thickness of 0.00035 inch and the polypropylene is 75 to 100 gauge in thickness.

* * * * *